United States Patent [19]
Edem et al.

[11] Patent Number: 5,559,796
[45] Date of Patent: Sep. 24, 1996

[54] DELAY CONTROL FOR FRAME-BASED TRANSMISSION OF DATA

[75] Inventors: Brian C. Edem, San Jose; Debra J. Worsley, Santa Clara, both of Calif.

[73] Assignee: National Semiconductor Corporation, Santa Clara, Calif.

[21] Appl. No.: 396,445

[22] Filed: Feb. 28, 1995

[51] Int. Cl.⁶ .................................................. H04J 3/26
[52] U.S. Cl. ........................ 370/60; 370/94.1; 370/108
[58] Field of Search ........................ 370/60, 60.1, 94.1, 370/94.2, 108

[56] References Cited

U.S. PATENT DOCUMENTS

| | | | |
|---|---|---|---|
| 4,220,816 | 9/1980 | Howells et al. | 370/24 |
| 4,258,434 | 3/1981 | Glowinski et al. | 370/60 |
| 4,412,324 | 10/1983 | Glowinsky et al. | 370/58 |
| 4,530,088 | 7/1985 | Hamstra et al. | 370/110.1 |
| 4,549,292 | 10/1985 | Isaman et al. | 370/89 |
| 4,587,650 | 5/1986 | Bell | 370/86 |
| 4,637,014 | 1/1987 | Bell et al. | 370/89 |
| 4,782,485 | 11/1988 | Gollub | 370/118 |
| 4,845,609 | 7/1989 | Lighthart et al. | 364/200 |
| 4,858,232 | 8/1989 | Diaz et al. | 370/86 |
| 4,876,683 | 10/1989 | Suzuki | 370/97 |
| 4,961,188 | 10/1990 | Lau | 370/94.2 |
| 5,001,707 | 3/1991 | Kositpaiboon et al. | 370/94.1 |
| 5,007,045 | 4/1991 | Tsuzuki | 370/94.10 |
| 5,065,398 | 11/1991 | Takashima | 370/94.1 |
| 5,138,440 | 8/1992 | Radice | 358/13 |
| 5,208,807 | 5/1993 | Gass et al. | 370/94.2 X |
| 5,406,559 | 4/1995 | Edem et al. | 370/108 X |
| 5,440,556 | 8/1995 | Edem et al. | 370/108 X |

OTHER PUBLICATIONS

Integrated PBX Systems, An NCC State fo the Art Report, The National Computing Centre Limited, 1987.
ISDN Basic Rate Interface System Design Guide, Telenetworks document, Aug. 1989.
ISDN Primary Rate Interface System Design Guide, Telenetworks document, Jul. 1989.
Draft Supplement to IEEE STD 802.3 CSMA/CD Access Method and Physical Layer Specifications, The Institute of Electrical and Electronic Engineers, Inc. Nov. 15, 1989.
Irube et al., "Integrated Information and Communication System for Business Networks", Hitachi Review, 40(3):241–247, 1991.
HMUX ERS "FDDI–II Hybrid Multiplexor" Rev. 2.4, 1991.
IBM Corporation, "Task Order", pp. 6–7, 1992.
DP8390, "Network Interface Controller: An Introductory Guide", LAN Databook, pp. 206–213, 1992.
DP83932B, "Systems–Oriented Network Interface Controller", LAN Databook, pp. 288–383, 1992.
DP83950A, "Repeater Interface Controller", LAN Databook, pp. 3–75, 1992.
DP83950EB at IEEE 802.3, Multi–Port Repeater Evaluation Kit, LAN Databook, pp. 75–87, 1992.
IEEE 802.9 Draft Standard Integrated Services (IS) LAN Interface at the MAC and PHY Layers, Institute of Electrical and Electronics, Nov. 1992.
"National Proposes Isochoronous Ethernet", Electronic News, vol. 38, No. 1940, p. 19, Nov. 1992.

(List continued on next page.)

*Primary Examiner*—Melvin Marcelo
*Attorney, Agent, or Firm*—Limbach & Limbach L.L.P.

[57] ABSTRACT

A network for transferring packet data in a frame structure, preferably mixed with isochronous data. The frame structure is a continuously repeating structure, with each frame having a number of time slots. Certain ones of the time slots are available for transmitting packet data. The packet data is re-timed, e.g., by using a FIFO to output the data nibble-wise as required by the frame structure. Information about variability in delays at the transmitting end is sent to the receiving end. The receiving end uses the information to eliminate the variability, such as by a variable delay FIFO, thus restoring/recreating the original packet and IFG timing. Preferably, the frame structure is translated to and from a packet structure to permit the present invention to be used with previously available packet circuitry such as a media access controller and a hub repeater circuit.

21 Claims, 14 Drawing Sheets

OTHER PUBLICATIONS

"IBM's Multimedia Venture: Opportunity for its Hardware?", vol. 38, No. 1930, p. 1, Sep. 1992.

C. A. Gallagher, IEEE 802.9: A multi-Service LAN Interface, Second IEEE National Conference on Telecommunications, Apr. 1989, York GB, pp. 173-178.

P. Martini, et al., "Real-Time Traffic in FDDI-II, Packet Switching vs. Circuit Switching", IEEE Infocom 1991, vol. 3, Apr. 1991, Bal Harbour, U. S., pp. 1413-1420.

F. E. Ross, et al., "FDDI-A Lan Among Man's Computer Communications Review", vol. 20, No. 3, Jul. 1990, New York, U.S., pp. 16-31.

T. Peatfield, "Compatibility with CSMA/CD Network System Topology", IEEE-802.9-94/12, Jan. 18, 1994.

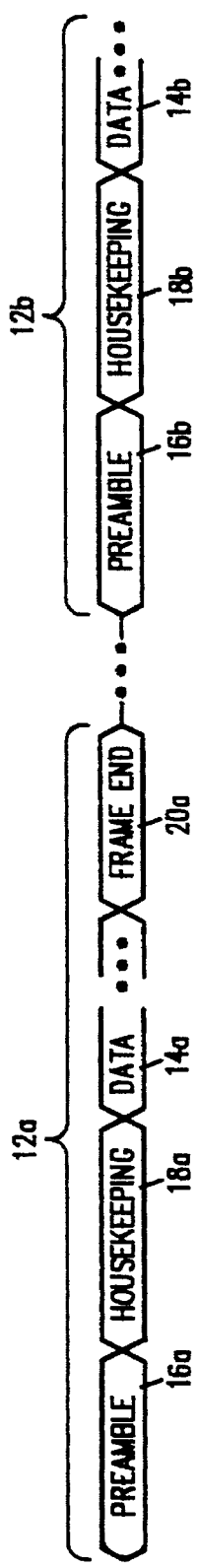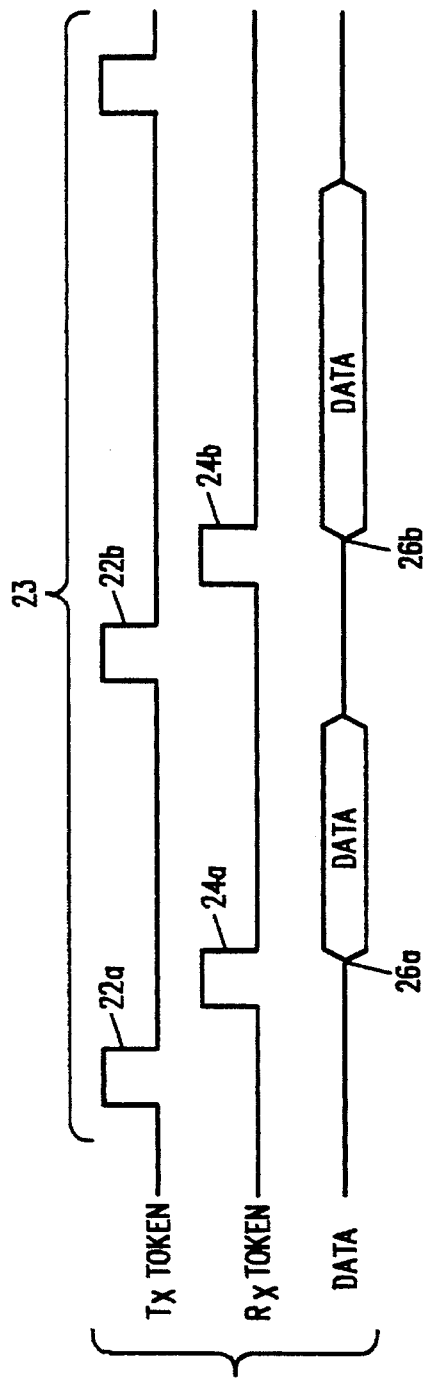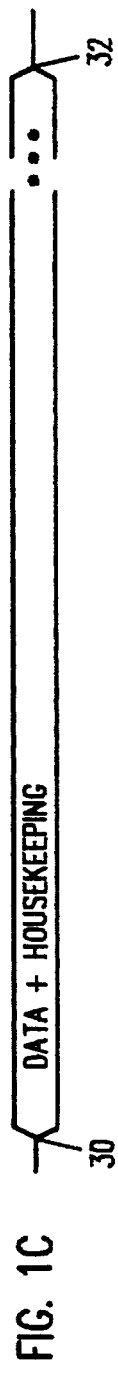

Ethernet Frame Format

IEEE 802.3 Frame Format

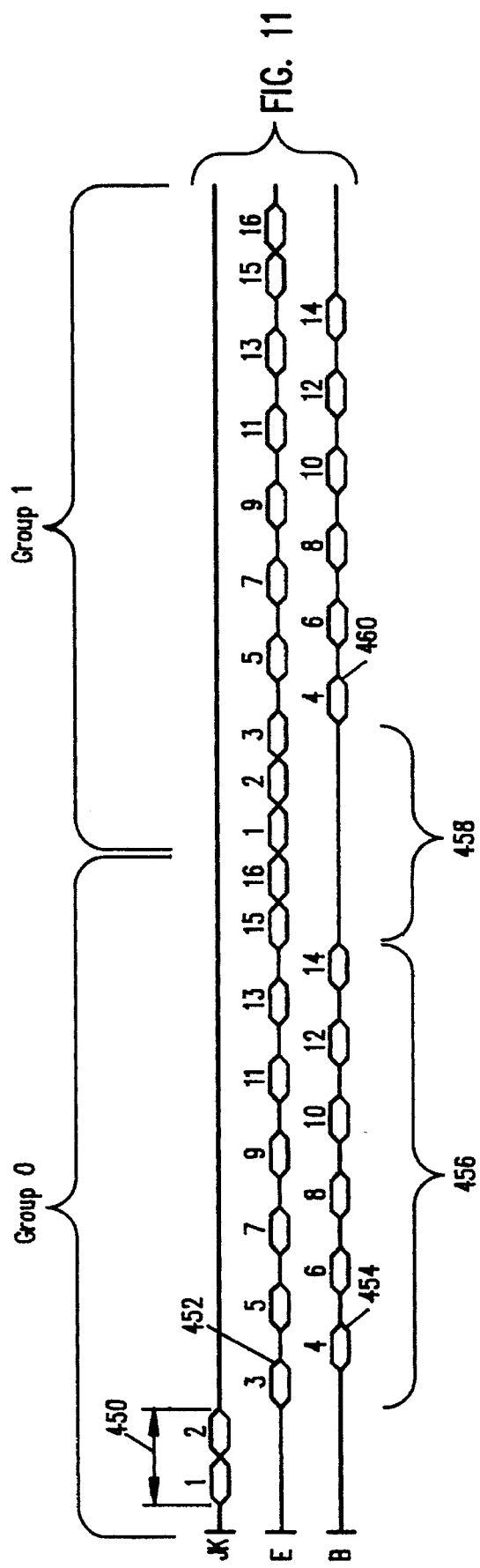

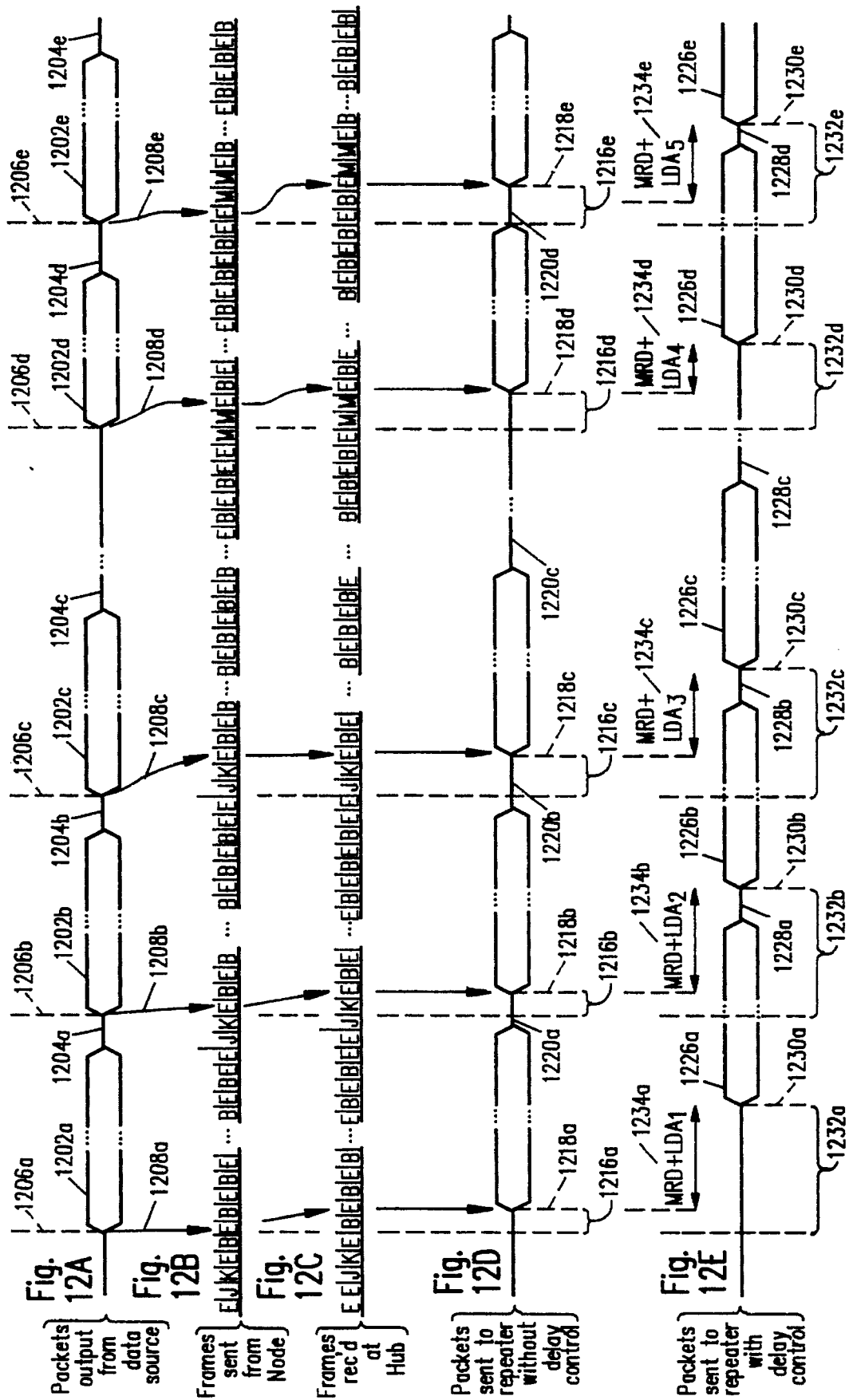

DELAY CONTROL FOR FRAME-BASED TRANSMISSION OF DATA

The present invention relates to a data communication network, such as a local area network or wide area network, and in particular to a network for providing controlled delay in the transfer of data between data stations.

BACKGROUND OF THE INVENTION

The previous networks for communicating packet data, although useful in certain situations, have suffered from certain deficiencies. Among these is the inability to effectively and efficiently transmit packet data on a frame basis, which has timing different from the packet timing, while retaining important packet timing features at the receiving end. It has further not been possible to efficiently transmit both the packet data and non-packet data, such as isochronous data, over the same physical media. Because isochronous-source data is not packetized, it cannot be accommodated in a packet format without substantially interfering with its isochronous character, often introducing an undesirable amount of delay or jitter.

The relationship between packetized data and isochronous data is best discussed after distinguishing between isochronous-source data and isochronous data transfer. In general terms, isochronous data is data which is non-packetized and of indeterminate, potentially continuous duration. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b, housekeeping information 18a, 18b such as data source information, data destination information, and the like. Preferably, the data in each packet is provided in a single, continuous field. In some packet schemes, a frame end marker 20a is provided. In a typical packet system, there is no signal on the medium during the periods between packet transmissions, which periods can be of varying, indeterminate length. In some embodiments, it is important to maintain this inter-frame gap (IFG) at a constant, or at least a minimum, value. As seen in FIG. 1A, because the fields provided for data 14a, 14b are not substantially continuous, the packetized scheme of FIG. 1A is not isochronous but is "bursty" in nature. The timing of packet transmissions is irregular, and generally determined by data needs. An example of packetized data transfer is the commonly-used Ethernet system, one implementation of which, known as 10BASE-T is described in the draft Nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring Network is described in IEEE standard 802.5.

In contrast, FIG. 1C schematically depicts isochronous data transfer. In isochronous data transfer, the data transfer or "connection" is initiated, such as by initiating a telephone conversation or beginning a video camera transmission 30. After the connection is initiated, transmission of the data, possibly accompanied by transmission of housekeeping information (such as destinations, audio or video timing, and the like), is provided substantially continuously for an indeterminate period, such as until termination of the connection. Although it may be that not every bit transferred represents a data bit (since, e.g., "housekeeping" bits may be also transferred), the transfer of data is substantially continuous in the sense that there are no substantial periods during which no information is transferred. It is possible that the data being transferred is "Null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4, dated Mar. 25, 1991.

Accordingly, it would be advantageous to provide an isochronous data communication system in which packetized data, such as Ethernet data, can be transferred across the physical media in a frame structure which is non-packetized (with timing different from the packet timing). Preferably, the frame structure can accommodate both the packet-source data and non-packet-sourced data, such as isochronous data. Preferably, the system would be substantially backwards-compatible for example with an existing Ethernet system so that existing nodes, e.g. non-isochronous nodes, could be put on the isochronous network and would be able to operate normally. The non-isochronous nodes could later be upgraded to take advantage of isochronous capability, as desired. Preferably at least some previous hardware, such as packet repeater hardware, can be used without substantial modification.

SUMMARY OF THE INVENTION

The present invention provides for transmitting packet-source data in a frame structure by re-timing the data, such as using a buffer to position bit groups of the data in predetermined time slots of recurring time frames or templates. At the receiving end of the transmission, the packet-source data is extracted from the frame and used to construct data packets at the receiving end, preferably having a form and relative timing substantially similar to the packets that were output from the packet-source, i.e., having form and relative timing sufficiently similar that the packets which are constructed at the receiving end can be handled by hardware and software in the same manner as if the packets output by the packet-source had been sent directly, without having been put in the frame.

In one embodiment, a variable delay device, such as a variable-length FIFO, is provided. The sending station (e.g. a node) sends information to the receiving station (e.g. a hub) which indicates the amount of delay in placing a given packet onto the physical media. The receiving end uses this information to delay the (reconstructed) packet the amount needed to compensate for the variability in sending-end delay. As a result, the receiving end can output reconstructed packets which have relative packet start times and IFGs substantially identical to the relative start times and IFG's of the packets which were output by the packet-sources.

In the frame transmission system, data which is provided in a packetized form is transmitted across the physical media in a frame form which is not itself packetized. Preferably, other time slots in each frame are used to transmit non-packet-source data such as isochronous data. Furthermore, other time slots can be used for frame start information, "D channel" information and/or M channel information. In this way, one portion of bandwidth on the link is dedicated to conveying the packet-source data and another portion of the bandwidth on the link can be dedicated to conveying non-packet-source data.

The system of the present invention can be provided so that it is transparent to previously-available Media Access Controllers ("MACs") such as Ethernet MACs and token ring MACs. In this embodiment, a system of buffering can be provided to convert between the packetized or token ring non-isochronous data which is output from or input to the MAC, and the frame-based data stream.

BRIEF DESCRIPTION OF THE DRAWINGS

FIGS. 1A, 1B and 1C are schematic diagrams of the timing of a packet transmission system, a token ring transmission system, and an isochronous transmission system, respectively.

FIG. 11 is a timing diagram showing, separately, the timing of time slots used for the frame synchronization, packet data and non-packet data during the initial portion of a frame structure as shown in Table I according to an embodiment of the present invention;

FIGS. 12A–12E are timing diagrams showing the relative timing of packets and frames.

DESCRIPTION OF THE PREFERRED EMBODIMENT

Figure 2:
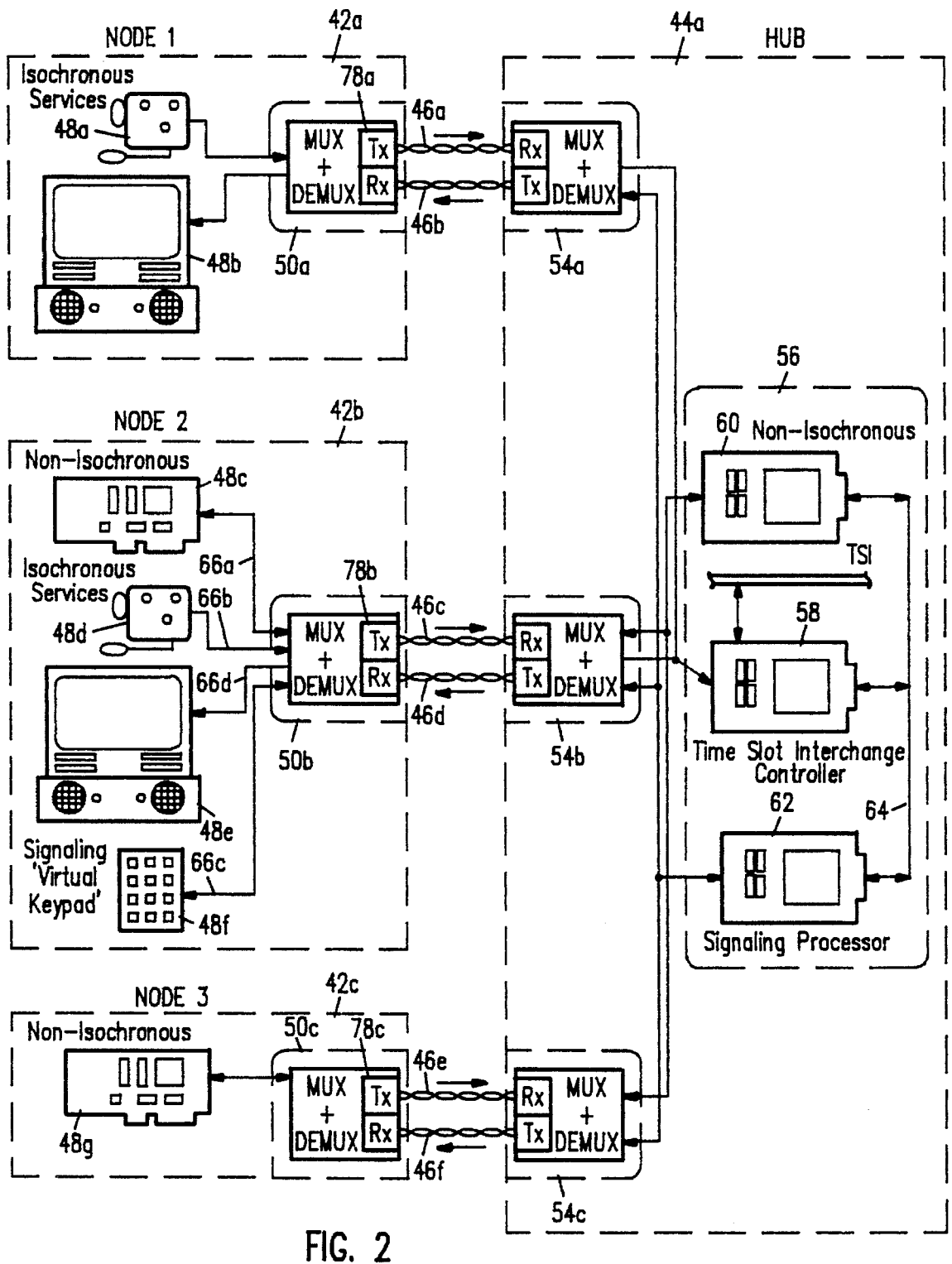
FIG. 2 is a schematic block diagram showing three nodes connecting to a hub card according to one embodiment of the present invention.

Before describing delay control, an overview of a communications system which can be used in connection with the present invention will be provided. According to one embodiment, a data communication system for packet-sourced data, preferably mixed with isochronous-sourced data, can be configured in a star topology with a plurality of nodes 42a, 42b, 42c (FIG. 2) (collectively, 42) each coupled to a hub 44a by data links comprising physical data transmission media such as one-way twisted pair wires 46a–46f (collectively, 46). Preferably it is possible to use previously available physical media, such as twisted pair media, without degrading data rates achieved previously on the media, such as data rates achieved on previous Ethernet or token ring networks. In one embodiment, functionality of previously available physical media is preserved by using an efficient coding scheme permitting a given amount of bandwidth to convey both isochronous traffic and previous types of data traffic such as Ethernet or token ring-type traffic.

The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c (collectively, 50) for receiving data, converting it to a form suitable for transmission (via transmitters 78a, 78b, 78c; collectively, 78) onto the physical media 46a, 46c, 46e and receipt of signals from the physical media 46b, 46d, 46f and conversion to a form suitable for use by the data sinks. The nodes 42a, 42b, 42c include data sources and sinks 48a–48g. The data sources and sinks can be isochronous sources and sinks such as video cameras 48a, 48d and monitors 48b, 48e, packet sources and sinks such as an Ethernet media access controller 48c, 48g, and control signaling or D channel sources and sinks such as an emulated or virtual key pad 48f provided, for example, on a personal computer (PC) terminal. Each of the nodes 42a, 42b, 42c can include various types of sources and sinks, e.g., strictly isochronous sources and sinks, such as depicted for node 42a, strictly packet-based sources/sinks as depicted for node 42c or both isochronous and packet sources and sinks as depicted for node 42b. It is not necessary that each node contain both a source and a sink.

In one embodiment, data from an isochronous data source is time-division multiplexed with the data from a packet source such as the data output from the media access controller from a previously available packet-form network node. These two data streams are preferably also multiplexed with maintenance data ("M channel") and connection control ("D channel") data (such as destination, source bandwidth and status information). In this embodiment, the various types of data are time-division-multiplexed in a repeating frame structure or template. The template is constructed to satisfy the data rate requirements of the various data sources and sinks. For example, a typical Ethernet source/sink requires that no more than 800 ns separates two contiguous data bytes. In one embodiment, services provided over each link include a transparent full duplex isochronous channel of 6.144 Mb/s (which is switchable at 64 Kb/s granularity), a 64 Kb/s D channel, a 96 Kb/s M channel, a 10 Mb/s packet channel for bandwidth sharing between nodes, and an 80Kb/s bandwidth for transmitting additional information.

The data streams are encoded for transmission using an efficient coding scheme which permits packet-sourced data to be transmitted at a rate not substantially smaller than, and preferably substantially equal to, the data rate at which the packet-sourced data was transmitted according to previously available network systems.

Figure 3:
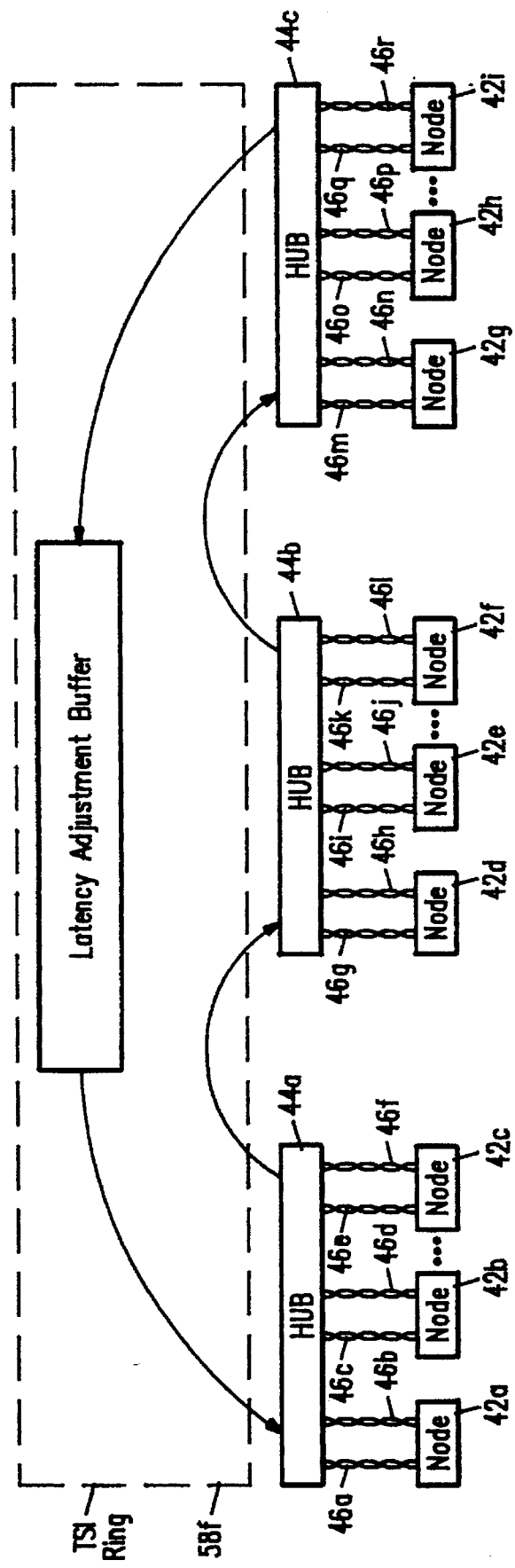
FIG. 3 is a schematic block diagram showing a number of hubs connected together using a ring structure.

Preferably, the present system is implemented as a star-topology network with data sources transmitting to a central hub which, in turn, transmits the data to data sinks. A single node can act as both a source and a sink. Several such star-topology systems can be connected by providing interconnection of the hubs, for example, in a ring structure (FIG. 3) or a tree structure.

The hub 44a includes circuitry 54a, 54b, 54c (collectively, 54) generally similar to node circuitry 50a, 50b, 50c for receiving data from the physical media 46a, 46c, 46e separating the isochronous-sourced data from the packet-sourced data, the D channel and M channel data and converting separated data into a form suitable for handling by downstream hub circuitry 56. The multiplexed data which arrives at the hub is demultiplexed to separate the isochronous-source data, the packet-sourced data, the D channel, M channel and any other time-multiplexed data. The packet-sourced data can be provided to hub circuitry specialized for handling the packet-sourced data stream. In one embodiment, circuitry in the hub will convert the separated packet-sourced data stream into a form substantially similar to the form the data stream would have after arrival over a previously available packet network. For example, where packet data is sourced from an Ethernet MAC, the hub will convert the separated non-isochronous data to a form such that it can be properly handled by standard Ethernet hub repeater circuitry. The hub contains multiplexers for combining both isochronous-sourced data and packet data, e.g., from Ethernet hub repeater circuitry. These data sources, along with M channel data, D channel data, and any other desired data, are multiplexed in a fashion similar to the multiplexing which occurred at the nodes and the multiplexed data is transmitted back to the nodes, preferably over a separate set of one-way twisted pair media. The nodes contain demultiplexers, similar to those found in the hub, for separating the isochronous sourced data, packet-sourced data and D channel, M channel and other data streams. The separated packet-sourced data is preferably converted to a form compatible with previously available media access controllers, such as the media access controllers which sourced the packet-sourced data. The isochronous data may be provided to isochronous data sinks connected to the node.

In the depicted embodiment, the separated isochronous-sourced data is provided to a time slot interchange controller for placing the data on a high-bandwidth bus so that it can be transported to and retrieved by other hub circuitry or provided to circuitry 54a, 54b, 54c for transmission to various destination nodes 42a, 42b, 42c. The D channel and M channel data is provided to a signaling processor 62 which performs various maintenance and control functions such as identifying and alerting users of error conditions and setting up requested connections, i.e. source/destination paths e.g. by communicating with the isochronous and non-isochronous controllers 58, 60, e.g. over data path 64. The separated packet-sourced data is provided to circuitry 60 configured to convey the non-isochronous data to the hub circuitry 54a, 54b, 54c for transmission to destination nodes 42a, 42b, 42c. In an embodiment in which packet-sourced data includes Ethernet data, the hub circuitry 60 can be a standard Ethernet repeater. In this way, a system which incorporates the present invention can be at least partially backwards-compatible with previous Ethernet hub systems.

In some cases, in order for circuitry 60 to properly handle the packet-sourced data, it must be provided to the circuitry 60 with substantially the same form and timing as it was output by the packet-source. Preferably it will be provided in a plurality of packets having the same relative packet start times and/or IFG's as the packets output by the packet source. The present invention is directed to providing this form and timing of packets in the receiving data station. Before describing embodiments for achieving this packet structure, it will be useful to describe an example of a frame structure and the conversion of packet-source data into such a frame structure.

Data sent from an isochronous device, e.g., 48d is a continuous stream of digitized data from, e.g., a video camera. In one example, the data from isochronous device 48d will be taken as having a data rate equal to the American "T1" standard of 1.544 Mb/s. Data output from the Ethernet MAC 48c is provided at the standard 10BASE-T Ethernet rate of 10 Mb/sec. D channel information is provided from a D channel data stream source, preferably contained in a MAC or other circuitry in the system or, for example, from the virtual keypad 48f at a variable data rate, such as a rate not exceeding about 64 Kb/sec. These incoming data streams are provided over lines 66a, 66b, 66c to node circuitry 50b. The incoming data from the various sources is provided to a multiplexer 70 which performs time-division multiplexing on a four-bit basis. The pattern for the time-division multiplexing is a repeating series of frames or templates. In this embodiment of the invention, the frames are repeated every 125 microseconds. Preferably, signals are defined by a series of frame start signals, occurring every 125 microseconds.

Figure 10A:
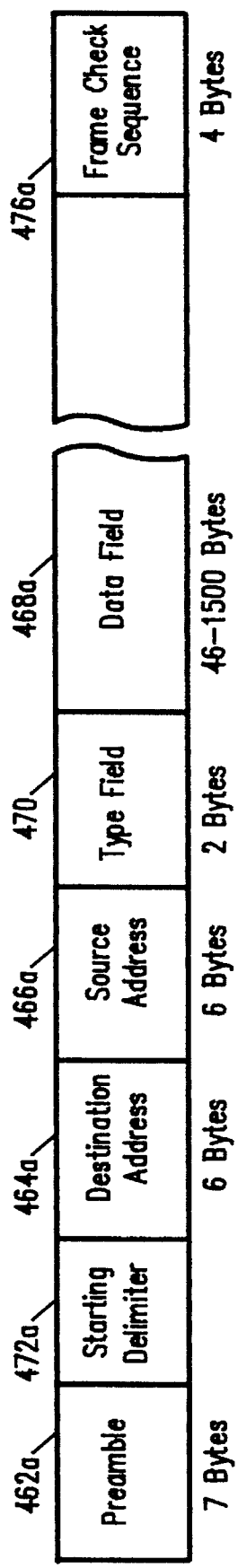
FIGS. 10A and 10B are block diagrams depicting frame formats for packet systems.
Figure 10B:
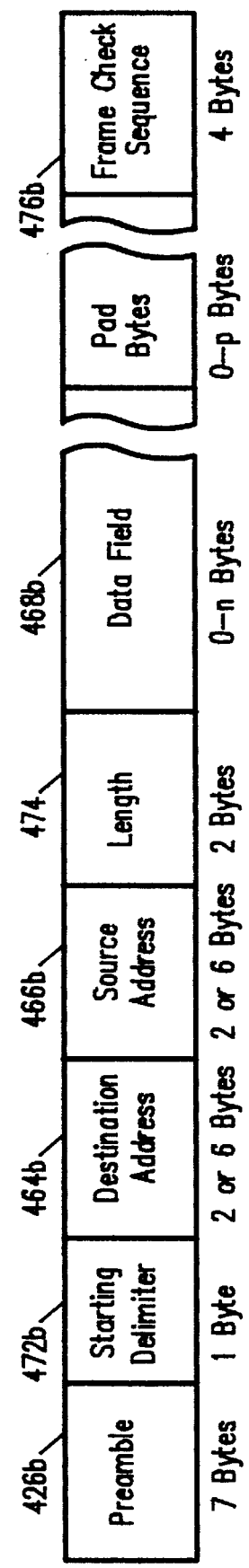

A number of packets are used in different implementations of Ethernet systems, two of which are depicted in FIGS. 10A and 10B. In a typical Ethernet system, the initial portion of the packet includes a number of preamble bytes 462a, 462b. The packet also includes destination address information 464a, 464b, starting delimiter 472a, 472b, source information 466a, 466b, and data fields 468a, 468b. Depending on the particular packet format used, the data field could be between 46 and 1500 bytes in length (468a) or between 0 and n bytes (468b). Additional packet fields which may be provided, depending on the Ethernet system implementation include type fields 470, length fields 474, and frame check sequence fields 476a, 476b. In a typical Ethernet system, the output of an Ethernet packet can be detected by the presence of a carrier signal on the medium. Thus, in a typical sequence, a media access controller would not output any carrier for an amount of time, then (depending on the particular collision avoidance system implemented for the Ethernet system) would output a packet such as those depicted in FIGS. 10A and 10B which would be accompanied by the presence of a carrier signal on the medium. When the media access controller had finished outputting the packet, there would again be no carrier on the medium. FIG. 12A depicts timing of a plurality of Ethernet frames 1202a–1202e, separated by IFG's 1204a–1204d.

Figure 7A:
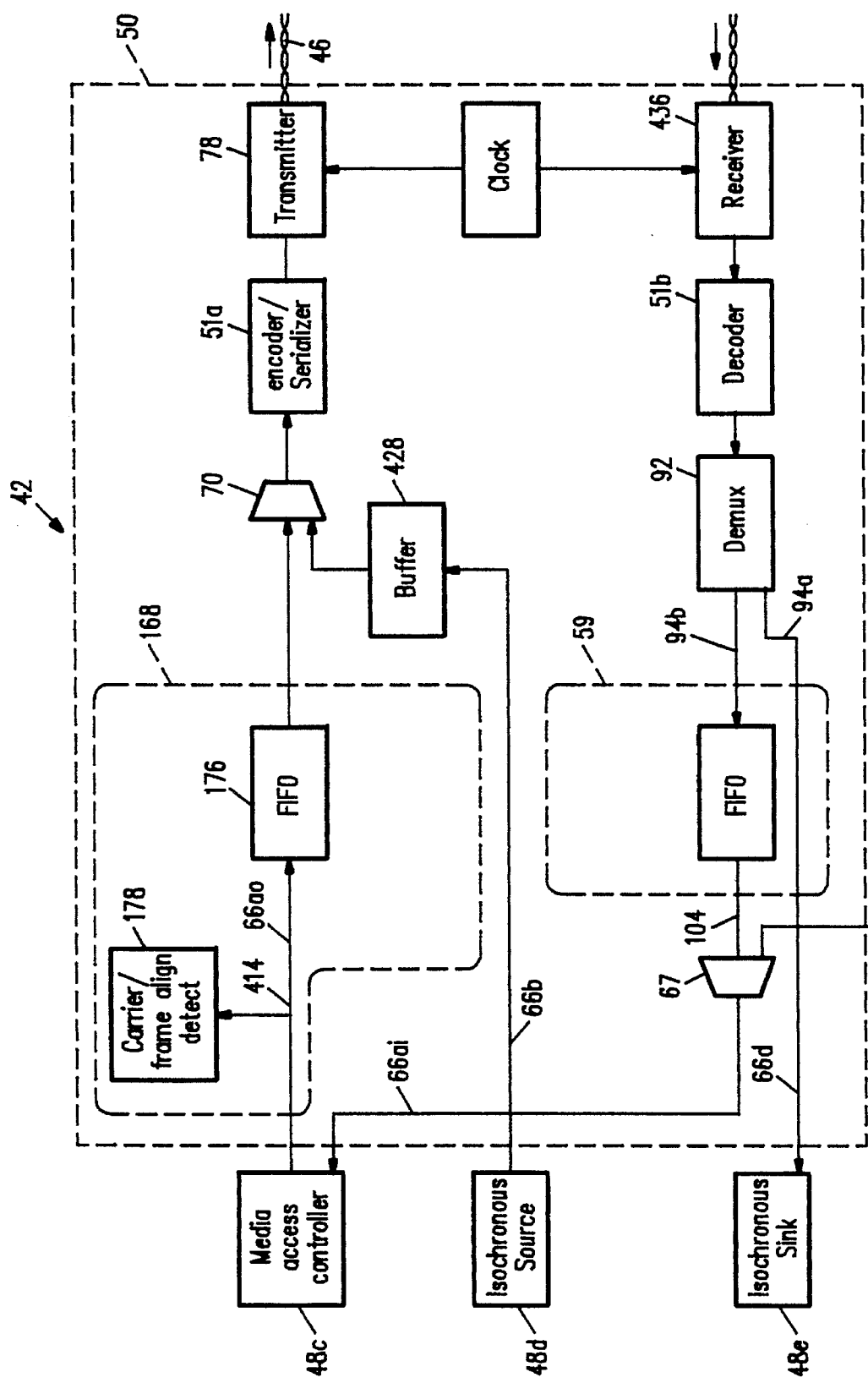
FIGS. 7A and 7B are block diagrams depicting handling of data sent from a media access controller and an isochronous source to a hub and returned to the media access controller and an isochronous sink according to an embodiment of the present invention, with FIG. 7A showing handling of data in the associated node and FIG. 7B showing handling of data in the associated hub.

FIG. 7A depicts a node 42 with circuitry 50 connected to a media access controller 48c and isochronous source and sink 48d, 48e. Although, as depicted in FIG. 2, a node will typically also handle D-channel and M-channel data as well, these are not depicted in FIG. 7A, for the sake of simplicity. In the embodiment depicted in FIG. 7A, sync detect circuit 178 is connected to the output 66ao from the media access controller 48c which detects the presence or absence of a carrier. As described more fully below, the frame structure for transmitting the packet-sourced data is a continuously repeating frame structure so that there will always be a carrier signal on the physical medium 46 while the system is in operation. Since the presence or absence of a carrier is important to the destination (i.e., both the hub repeater 60 and the ultimate node destination 48g) the carrier/no-carrier information should be preserved. In the embodiment depicted in FIG. 7A, this is achieved by instructing an encoder 51a to output a bit group which is reserved for indicating the absence of a carrier. This "no-carrier" bit group will be inserted in the time slots reserved for the packet-sourced data until such time as a packet is output from the media access controller.

When the packet is output by the media access controller, the packet of data is input to a first-in-first-out ("FIFO") memory 176. The FIFO 176 is provided for re-timing the data. A packet output by the media access controller will contain a number of 8-bit bytes of information. These will be output by the MAC at a predetermined data rate. For example, during transmission of a given packet of Ethernet data, one byte will be transmitted every 800 nanoseconds. However, this date rate, at least during a small time period (e.g., about 125 microseconds), is different from the rate at which the packet data (after being put into the frame time slots) will be placed on the physical medium 46. The data is output on physical medium 46 in 125 microsecond frames, each frame having 256 bytes. Accordingly, a 4 bit nibble is output every 0.2441 microseconds. However, not every time slot of the frame is used for packet-sourced data. Referring to Table I and FIG. 11, after the output of the first 4 bits of Ethernet data 452, there will be a wait of 0.2441 microseconds (during which, isochronous data 454 will be output). This pattern will be repeated six times 456, after which, there will be a transmission of five nibbles of Ethernet data continguously 458. Thereafter, there will be another wait of 0.2441 sec 460 and so forth.

Thus, a given Ethernet packet of data will be output from the MAC at a substantially continuous rate (during the data field of the packet transmission) of one byte every 800 nanoseconds. However, the data will be placed onto the medium 46 in a discontinuous "lumpy" fashion with several contiguous time slots devoted to transmission of packet-data, but with other packet-data nibbles requiring delays between transmission. The FIFO 176 is provided to accommodate this pattern so that the packet contents can be input into the FIFO in a continuous fashion (during the time a packet is output from the MAC) and output from the FIFO, as needed, in a discontinuous nibble-wise fashion.

Figure 8:
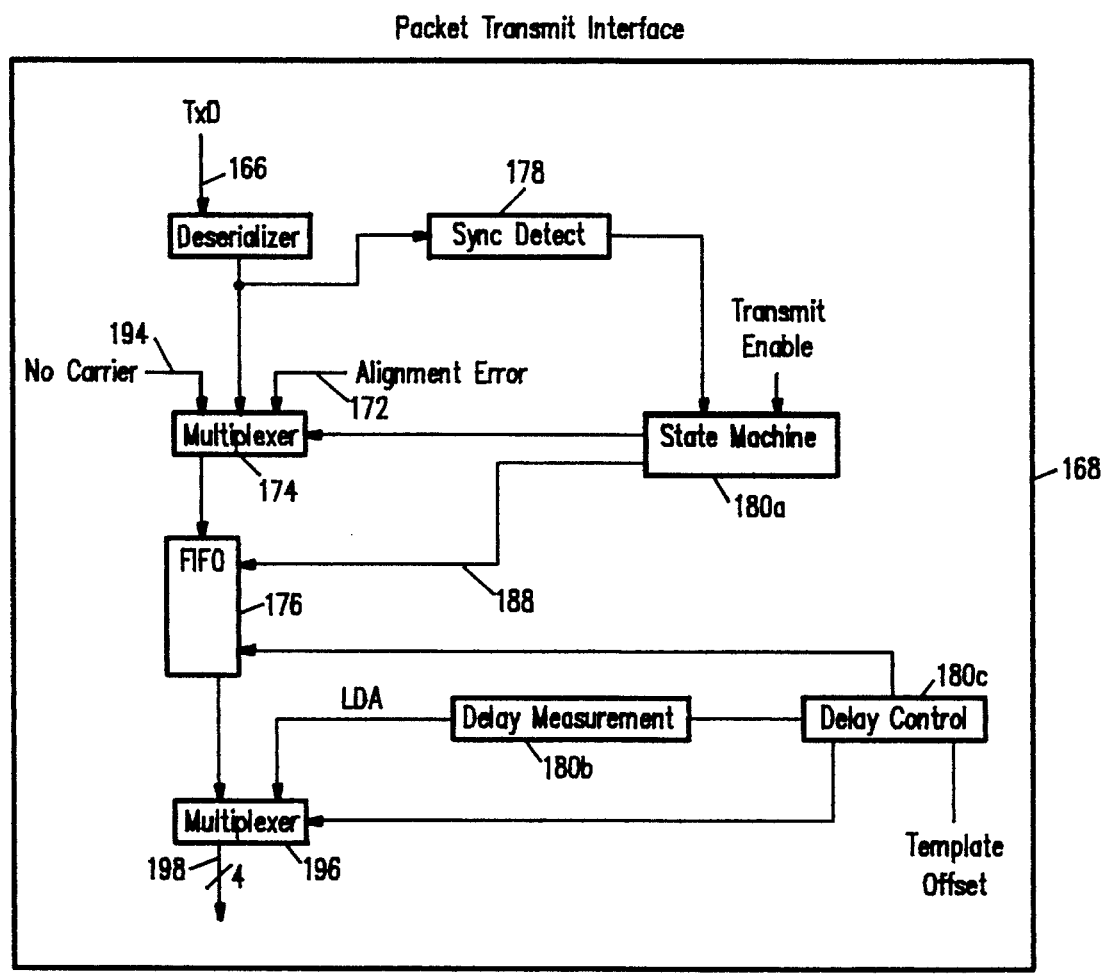
FIG. 8 is a block diagram of a packet transmit interface according to an embodiment of the present invention.

The FIFO 176, and sync detect circuitry 178 constitute a buffer circuit 168, which is shown in greater detail in FIG. 8 and discussed further hereinbelow. Timing circuitry (not shown) controls the rate at which nibbles are output from 176. The timing is configured as to convey data to the transmitter 78 at the proper time slots in accordance with a predetermined template, such as that shown in Table I. This timing circuitry also controls the flow of isochronous data through the encoder 51a, preferably by controlling the output buffer 428 which receives data from isochronous source 48d.

Table I depicts the manner in which the various data streams, and additional data and control bytes are time-division multiplexed, according to one embodiment. Each symbol in Table I represents four bits of data so that every group of two symbols represents one 8-bit byte of data. In Table I, E represents four bits of data from the Ethernet stream 66a, B designates four bits of data from the isochronous stream 66b, D represents four bits of data from the control signaling or D channel stream 66c, and M represents four bits of maintenance data. In addition, certain byte-length patterns are provided. JK represents a frame synchronization pattern and EM (the first byte of block three in Table I) represents an Ethernet "pad" followed by a maintenance nibble.

As seen in Table I, each frame contains 256 bytes which can be considered in thirty-two groups of eight bytes each, or four blocks of sixty-four bytes each. The frame structure is described more thoroughly in commonly-assigned application Ser. No. 07/969,911, titled "Network for Transmitting Isochronous-Source Data with a Frame Structure", filed on Nov. 2, 1992, incorporated herein by reference. FIG. 11 shows the timing of time slots used for frame synchronization during the Group0 and Group1 portions of Table I. The sequence starts with frame synchronization pattern JK 450. Group0 is shown in FIG. 11 by the first grouping of nibbles 1–16, while Group1 is represented by the second grouping of nibbles 1–16.

TABLE I

| BLOCK 0: | | | | | | | | | | | | | | | |
|---|---|---|---|---|---|---|---|---|---|---|---|---|---|---|---|
| J | K | E | B | E | B | E | B | E | B | E | B | E | B | E | Group 0 |
| E | E | E | B | E | B | E | B | E | B | E | B | E | B | E | Group 1 |
| E | E | E | B | E | B | E | B | E | B | E | B | E | B | E | Group 2 |
| E | E | E | B | E | B | E | B | E | B | E | B | E | B | E | Group 3 |
| E | E | E | B | E | B | E | B | E | B | E | B | E | B | E | Group 4 |
| E | E | E | B | E | B | E | B | E | B | E | B | E | B | E | Group 5 |
| E | E | E | B | E | B | E | B | E | B | E | B | E | B | E | Group 6 |
| E | E | E | B | E | B | E | B | E | B | E | B | E | B | E | Group 7 |
| BLOCK 1: | | | | | | | | | | | | | | | |
| M | M | E | B | E | B | E | B | E | B | E | B | E | B | E | Group 8 |
| E | E | E | B | E | B | E | B | E | B | E | B | E | B | E | Group 9 |
| E | E | E | B | E | B | E | B | E | B | E | B | E | B | E | Group 10 |
| E | E | E | B | E | B | E | B | E | B | E | B | E | B | E | Group 11 |
| E | E | E | B | E | B | E | B | E | B | E | B | E | B | E | Group 12 |
| E | E | E | B | E | B | E | B | E | B | E | B | E | B | E | Group 13 |
| E | E | E | B | E | B | E | B | E | B | E | B | E | B | E | Group 14 |
| E | E | E | B | E | B | E | B | E | B | E | B | E | B | E | Group 15 |

TABLE I-continued

BLOCK 2:

| D | D | E | B | E | B | E | B | E | B | E | B | E | B | E | E | Group 16 |
|---|---|---|---|---|---|---|---|---|---|---|---|---|---|---|---|----------|
| E | E | E | B | E | B | E | B | E | B | E | B | E | B | E | E | Group 17 |
| E | E | E | B | E | B | E | B | E | B | E | B | E | B | E | E | Group 18 |
| E | E | E | B | E | B | E | B | E | B | E | B | E | B | E | E | Group 19 |
| E | E | E | B | E | B | E | B | E | B | E | B | E | B | E | E | Group 20 |
| E | E | E | B | E | B | E | B | E | B | E | B | E | B | E | E | Group 21 |
| E | E | E | B | E | B | E | B | E | B | E | B | E | B | E | E | Group 22 |
| E | E | E | B | E | B | E | B | E | B | E | B | E | B | E | E | Group 23 |

BLOCK 3:

| E | M | E | B | E | B | E | B | E | B | E | B | E | B | E | E | Group 24 |
|---|---|---|---|---|---|---|---|---|---|---|---|---|---|---|---|----------|
| E | E | E | B | E | B | E | B | E | B | E | B | E | B | E | E | Group 25 |
| E | E | E | B | E | B | E | B | E | B | E | B | E | B | E | E | Group 26 |
| E | E | E | B | E | B | E | B | E | B | E | B | E | B | E | E | Group 27 |
| E | E | E | B | E | B | E | B | E | B | E | B | E | B | E | E | Group 28 |
| E | E | E | B | E | B | E | B | E | B | E | B | E | B | E | E | Group 29 |
| E | E | E | B | E | B | E | B | E | B | E | B | E | B | E | E | Group 30 |
| E | E | E | B | E | B | E | B | E | B | E | B | E | B | E | E | Group 31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel The described frame structure and frame transmission rate provides data rates for the isochronous and non-isochronous data which are compatible with, e.g., 10BASE-T Ethernet data rates. In addition, the placement of different channels was chosen to minimize the amount of FIFOing needed by the packet and isochronous data streams to provide a continuous flow of data. Other types of frame structures could be used in connection with other isochronous and/or non-isochronous data sources and sinks such as other types of packet-based systems, or token ring sources and sinks, in which case a different frame structure or template can be used to provide an allocation of bandwidth suited for the particular purpose.

The time-multiplexed data is then encoded by an encoder/serializer 51a. The purpose of the encoder/serializer 51a is to place the nibble/wise data received from the FIFO 176 and the buffer 428 into a 4/5 encoded form. One particular form of four/five encoding conforming partially to the ANSII X3T9.5 standard, is depicted in Table II.

TABLE II

| Symbol | Encoded (5 bit) | Description |
|--------|-----------------|-------------|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |

TABLE II-continued

| Symbol | Encoded (5 bit) | Description |
|--------|-----------------|-------------|
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

The results of the four/five encoding is then further encoded by encoder 74 (FIG. 4) using a non-return to zero, inverted (NRZI) scheme. On average, this scheme provides one clock bit per every bit of data. Thus the standard Ethernet data rate of 10 Mbit/sec, after manchester encoding, results in a signalling rate of 20 Mbit/sec.

Comparing the standard Ethernet signalling rate and data rate to that provided by the frame structure of Table I and encoding of Table II, it is seen that, in the present scheme, a frame of data contains 313 "E" symbols or 1252 E bits. By transmitting frames at a rate of one frame every 125 microseconds, the present scheme has a capacity for transmitting 10.016 Mbits/sec of Ethernet-sourced data interspersed with 6144 Kbits/sec of isochronous data. Thus by using the four/five-NRZI encoding, the data rate and signaling rate is within two and one-half percent of the signaling and data rate used by 10BASE-T, allowing both isochronous traffic and Ethernet traffic to travel over existing physical media 46 without seriously degrading the data rate of the Ethernet traffic, compared to previous standard Ethernet systems. Moreover, provision of substantially standard Ethernet data rates contributes to the ability to implement the present invention without the necessity for replacing in-place MACs or repeater circuitry. The ability to convey data frames substantially at the signaling rate used by previously-available systems, such as standard Ethernet, contributes to the ability to implement the present invention without the necessity to replace in-place physical media, such as twisted pair media.

The encoding scheme preferably has sufficient efficiency that the bandwidths of both the incoming non-isochronous data, such as the data on line 66a, and the incoming isochronous data, such as the data on line 66b, can be accommodated on the physical media 46 without serious degradation, preferably without any degradation, of bandwidth formerly available for the non-isochronous data. These characteristics are summarized in Table III.

TABLE III

| Channel | Bytes/ Frame | Bits/ Frame | Kbits/ sec | Usage |
|---|---|---|---|---|
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
|  | 256.0 | 2,048 | 16.384 Mbits/sec | |

Although the four/five-NRZI encoding is particularly useful in connection with an Ethernet non-isochronous source, other types of encoding or decoding can also be used in the present systems, including a scheme encoding 8 bits into 10 bits or a scrambling scheme.

The output from the encoding devices 72, 74 (FIG. 4) is sent to pre-emphasis circuitry 76. The pre-emphasis circuitry compensates the signal transmitted onto the physical medium to reduce the jitter. The data output by the pre-emphasis circuitry 76 is sent to a transmitter or driver 78 and the signal is transmitted over the physical medium 46. The physical medium 46 can be any of a number of media types including twisted pair, coaxial or fiber optic cable.

Figure 7B:
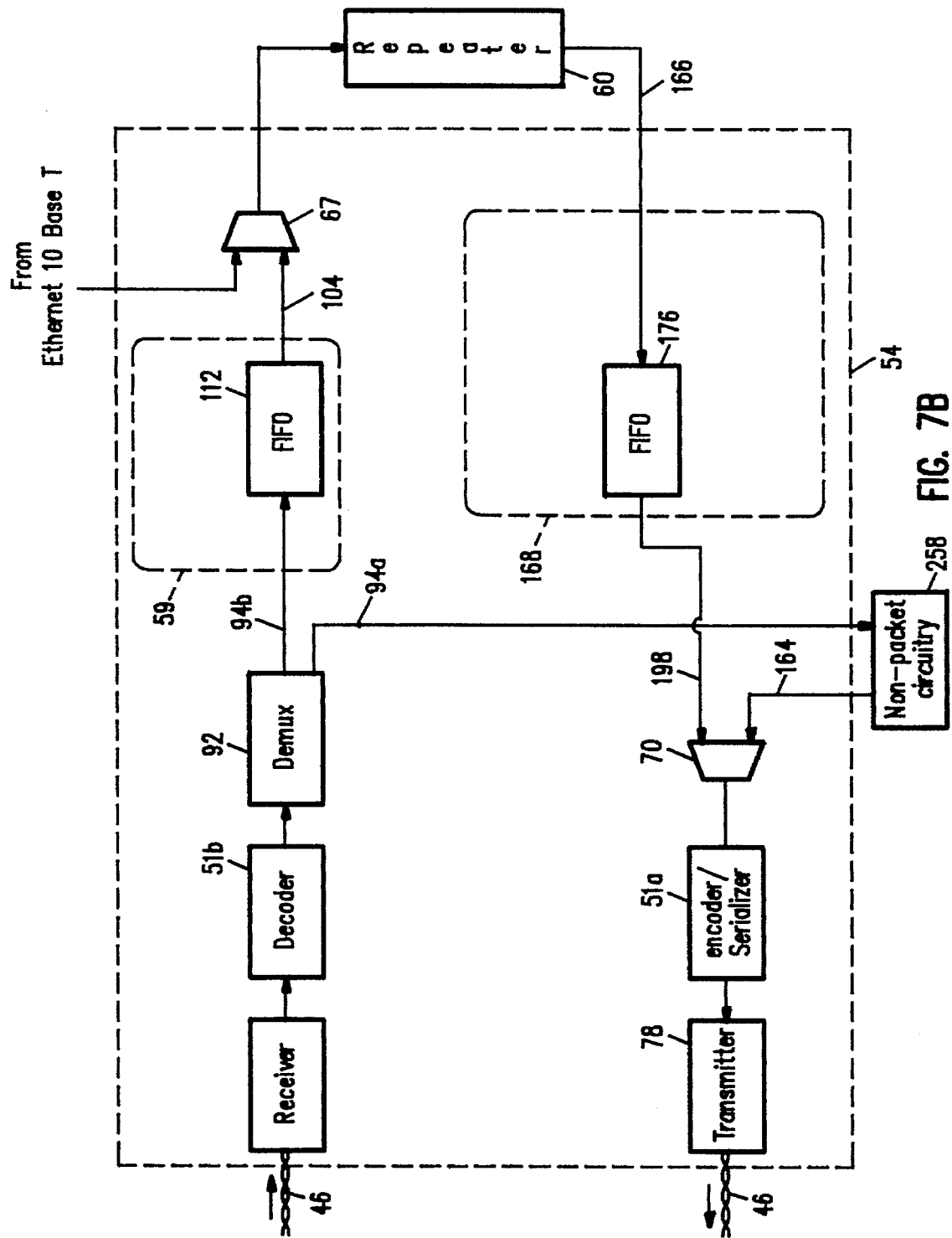

The data sent over the physical media 46 is received in the hub 44. The hub contains a plurality of circuit devices 54a, 54b, 54c, which can be physically identical to circuit devices 50a, 50b, 50c associated with the nodes. Each circuit 54a, 54b, 54c is coupled to one of the nodes 42a, 42b, 42c by the physical media 46. As depicted in FIG. 7B, the data transmitted over the physical media 46 arrives serially at a deserializer/decoder 51b. Link detect circuitry 82 (FIG. 5) also receives the data from the physical media 46 for detection of the mode in which the node is operating (e.g. 10BASE-T or isochronous Ethernet) and outputting a mode select signal, as described more fully in commonly-assigned application Ser. No. 07/971,018, titled "Network Link Endpoint Capability Detection", filed on Nov. 2, 1992, now abandoned, and incorporated herein by reference.

Figure 4:
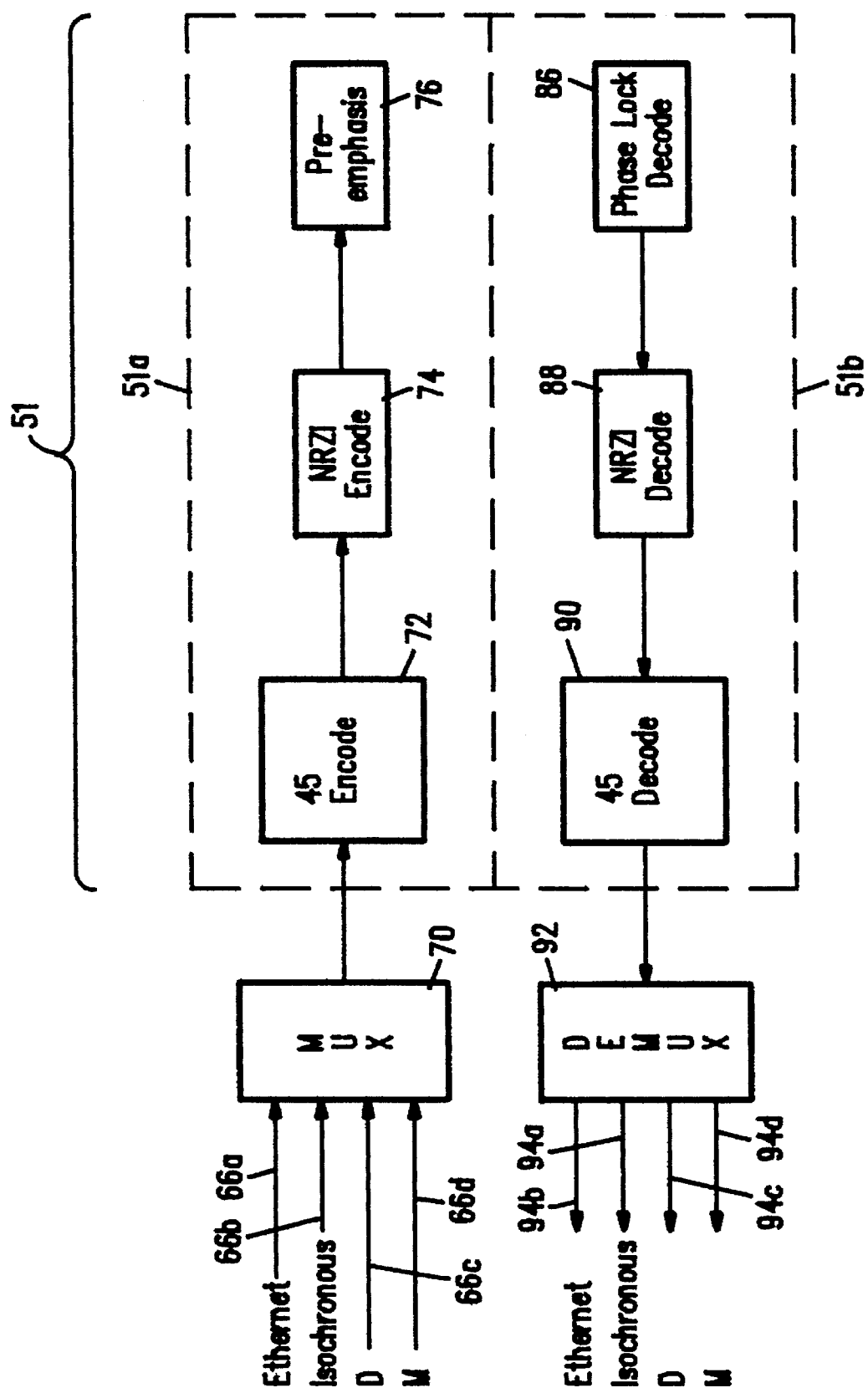
FIG. 4 is a block diagram depicting the multiplexing encoding/decoding and pre-emphasis circuitry.

The de-serializer/decoder 51b includes circuitry which is functionally an inverse of the multiplexing/encoding circuitry 51a described above. Referring to FIG. 4, the deserializer/decoder 51b includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a and the packet-sourced data 94b. Signaling data, such as D channel 94c and maintenance data 94d, if present, can also be separated at this point.

Both the packet-sourced data 94b and the isochronous-sourced data 94a are made available to the various hub circuitry components 54a, 54b, 54c, as needed for transmission back to destination nodes or to connected hubs. In one embodiment, the separated isochronous data 94a and packet-sourced data 94b are reconfigured by the respective interfaces 57, 59 to provide isochronous output 102 and packetized output 104 in a form suitable for processing so as to provide the data as needed for transmission to the destination nodes. Although FIG. 7B depicts only a single incoming twisted pair and a single outgoing twisted pair, there typically will be many sets of twisted pairs, each connected to a different node. Each set of outgoing twisted pairs will be connected to its own transmitter 78, encoder/serializer 51a and E transmit interface 168. Thus, isochronous data on line 164 from the non-packet circuitry 258 (which can include, e.g., the receiver "B" interface 57 (FIG. 5), the time slot interchange controller 58 (FIG. 2) and the transmitter "B" interface 57') and non-isochronous data on line 166 from the repeater 60 are first conveyed to the proper set of output circuitry 54, i.e., the output circuitry which is connected to the destination node for that data.

In one embodiment, the packet-sourced data 94b is configured by the E receive interface so that the input data 104 can be processed by a repeater device 60 for provision to hub transmit circuitry and eventual transmission to destination nodes. As an alternative to using a repeater for the non-isochronous data, packet connections may be linked through media access control layer bridges. Preferably, the input data 104 is in a form such that it can be handled by repeater circuitry of types available in the prior art. In the present example, the packet-sourced data 94b is data which originated at the node 42b from an Ethernet MAC 48c and the input data 104 is in a form such that it can be handled by a standard Ethernet hub repeater 60 such as a DP83950 "Repeater Interface Controller" (RIC) available from National Semiconductor Corporation, Santa Clara, Calif. This configuration provides the advantage that the present invention can be implemented without replacing all hub circuitry, in particular without the replacing hub repeater circuitry.

Circuitry 59 can be used to re-time the data in a form appropriate for the repeater 60. Re-timing is necessary, at least for packet-sourced data, for reasons similar to that discussed above in connection with the necessity for the FIFO 176. In particular, the data received from the media 46 is provided in a discontinuous "lumpy" fashion. This "lumpy" data form is not acceptable for sending to repeater 60 which is configured to receive packets of data similar to the packets output by media access controller 48c. Accordingly, circuitry 59 re-times the discontinuous data to place them into a packet form. Circuitry 59 includes a FIFO 112 (FIG. 7B). FIFO's for isochronous data are described in application Ser. No. 08/147,359, titled "Data Communication Network with Transfer Port Cascade Port and/or Synchronizing Signal", filed Nov. 1, 1993, incorporated herein by reference.

Figure 6:
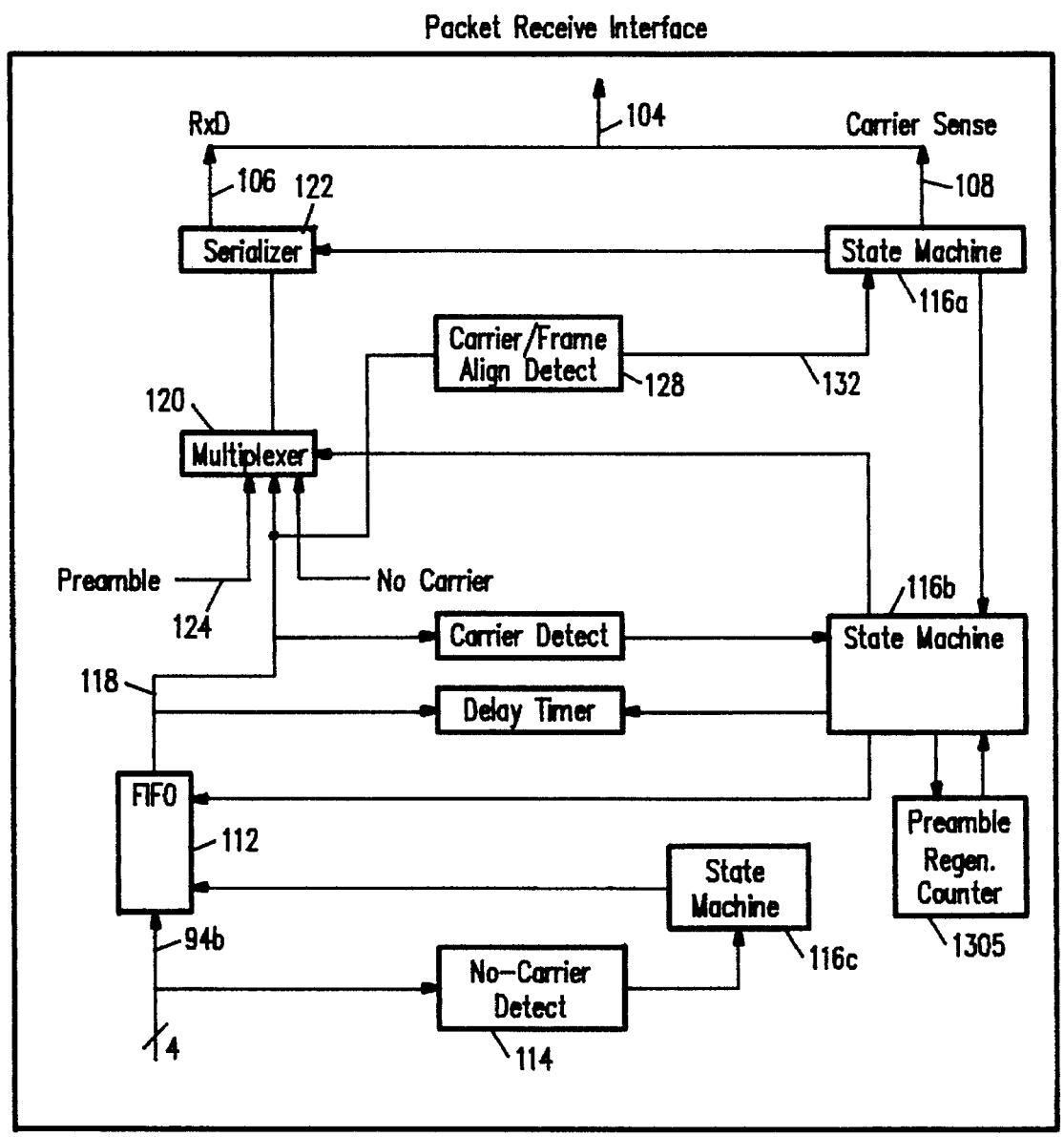
FIG. 6 is a block diagram depicting the packet receive interface according to an embodiment of the present invention.

FIG. 6 depicts one implementation of an "E" interface 59 of a type which will receive the non-isochronous data 94b and provide outputs 106, 108 of a type that can be processed by previously-available repeater circuitry 60. The non-isochronous data is received in a first-in-first-out (FIFO) buffer 112 (FIG. 7B) to smooth out data rates. Circuitry 114 detects "no carrier" symbols, provided to emulate Ethernet data packets, which will be used by logic circuitry or state machine 116c to output carrier detect signals. The output 118 from the FIFO 112 is provided to a multiplexer 120 and a serializer 122 to produce data output 106. The multiplexer 120 can receive a preamble stream 124 from a preamble detector 422 to provide the proper preamble bits in the output data 106. Output from the FIFO 112 is also provided to decode circuitry 128 to recognize alignment error symbols and output appropriate signals 132 to state machine 116a, which will generate carrier sense signal 108. Signals 106 and 108 collectively form packetized output 104.

In one embodiment of the invention, a further delay control is provided in the E receive interface 59 in order to preserve/recreate the timing of the packets such as that depicted in FIG. 12A. This is necessary because at least some repeater circuits require the original packet/IFG (relative) timing in order to function properly and because this timing may be changed or lost when the packet data is placed into the frame structure for transmission.

The process of placing packet data into a frame structure introduces an amount of variability into the timing of, for example, packet starts and/or IFG's. FIGS. 12A–12D illustrate one of the sources of this undesired variability. As shown in FIG. 12A, each of the packets 1202a–1202e is output from the packet data source (e.g., 48c) at packet start times 1206a–1206e. According to one embodiment, in the node circuitry 50b, contents of the packet 1202a will be fit into the first available "E" time slot of the frame. Even when an "E" time slot is immediately available, there will be some amount of delay 1208a, 1208b associated with "pretreatment" or "intelligent prestaging" such as encoding and multiplexing the data as described above. FIG. 12B depicts a plurality of recurring frames and the time slots within each frame. In the example depicted in FIGS. 12A–12D, an "E" time slot happens to be available immediately after the packet source begins the output each of the first two packets 1202a, 1202b. Thus, in this example, for the first two packets, the delay 1208a, 1208b between the beginning of the output of the data packets 1202a, 1202b from the packet source 48c and the time when the initial contents of the packets 1202a, 1202b are placed into an "E" time slot of a frame for transmission across the physical media 46c is a minimal delay. However, the situation is different for packet 1202c. At the time 1206c that packet 1202c is first output from the packet source 48c, the transmission frame (FIG. 12B) does not have an "E" slot immediately available. Instead, two time slots must pass before the next available "E" time slot. Accordingly, the delay 1208c in first placing the packet 1202c onto the physical media 46c is greater than the corresponding delays 1208a, 1208b in placing the contents from packets of 1202a, 1202b onto the physical media 48c. In the depicted example, when packet 1202d is output, there is not an "E" slot immediately available, but only a single time slot passes until the next "E" slot is available. Thus, delay 1208d is greater than delays 1208a, 1208b but less than delay 1208c. This illustrates one source of the variability in timing of the initial data from each of the packets 1202a, 1202e as the contents of the packets are placed onto the physical media 46c in a frame-based transmission.

Although, in the example above, transmission is said to begin with the first available "E" time slot, in some embodiments, the system may be configured to delay further, i.e. beyond the first available "E" time slot, e.g., to prevent overruns or underruns in the Ethernet packet FIFOs.

FIG. 12C depicts the timing of the data frames as received in the hub 44a. FIG. 12C depicts a situation in which the delay between placing data onto physical data at the node end and receiving that data at the hub end is substantially constant for all packets sent from a given node. Thus, the variability of delay depicted in FIG. 12B is also observed at the hub end, as shown in FIG. 12C.

FIG. 12D depicts the type of variability that would result if no account was taken of the delay variability noted above. FIG. 12D depicts the timing of packets which are constructed from the data extracted from the "E" time slots of the frames for sending to the repeater 60. FIG. 12D depicts a situation in which the reconstructed packets are output to the repeater substantially simultaneously with the hub's receipt of the first "E" time slot for each packet (i.e., the first "E" time slot which does not contain a "no carrier" signal). FIG. 12D illustrates that there is variability 1216a–1216e in the delays between the times 1206a–1206e when packets are first output from the packet source 48c and the times 1218a–1218e when the respective reconstructed packets are transmitted to the repeater 60. FIG. 12D also illustrates that the respective IFG's 1220a–1220d of the packets sent to the repeater 60 have durations which are different from the durations of the IFG's 1204a–1204d originally output from the packet source 48c.

According to an embodiment of the present invention, the variability depicted in FIGS. 12A–12D is accounted-for by sending information from a first data station (e.g., a node) to a second data station (e.g., a hub) about the variability and, using this information in the receiving data station to adjust a delay such that the reconstructed packets will have the same relative timing as the packets output from the data source. Preferably, the information sent from the first data station conveys information related to the variability, i.e. information related to the differences in duration of the delays 1208a, 1208b, 1208c, 1208d and 1208e. In one embodiment, the information represents the difference between a predetermined value, such as the maximum delay that could be expected (maximum transmit delay or "MTD") and the actual delay for this packet (transmit delay or "TD"). Thus, in one embodiment, the information, termed the "link delay adjustment" (LDA) is equal to MTD minus TD. Other embodiments could transmit, for example, the value of TD. In an embodiment which uses the frame structure depicted in Table I, there are never more than two time slots between two consecutive "E" time slots. Thus, in this embodiment, the maximum transmit delay (MTD) could be taken as the delay encountered for packet 1202c, since this represents the worst case (a delay of two time slots before the next "E" time slot). The LDA value which is transmitted can be in a number of different forms. In one embodiment, the LDA is expressed in bit times (BT). A bit time is the time required to transmit a single bit in the frame structure. Other embodiments could express LDA or TD in microseconds or other time units.

Figure 13:
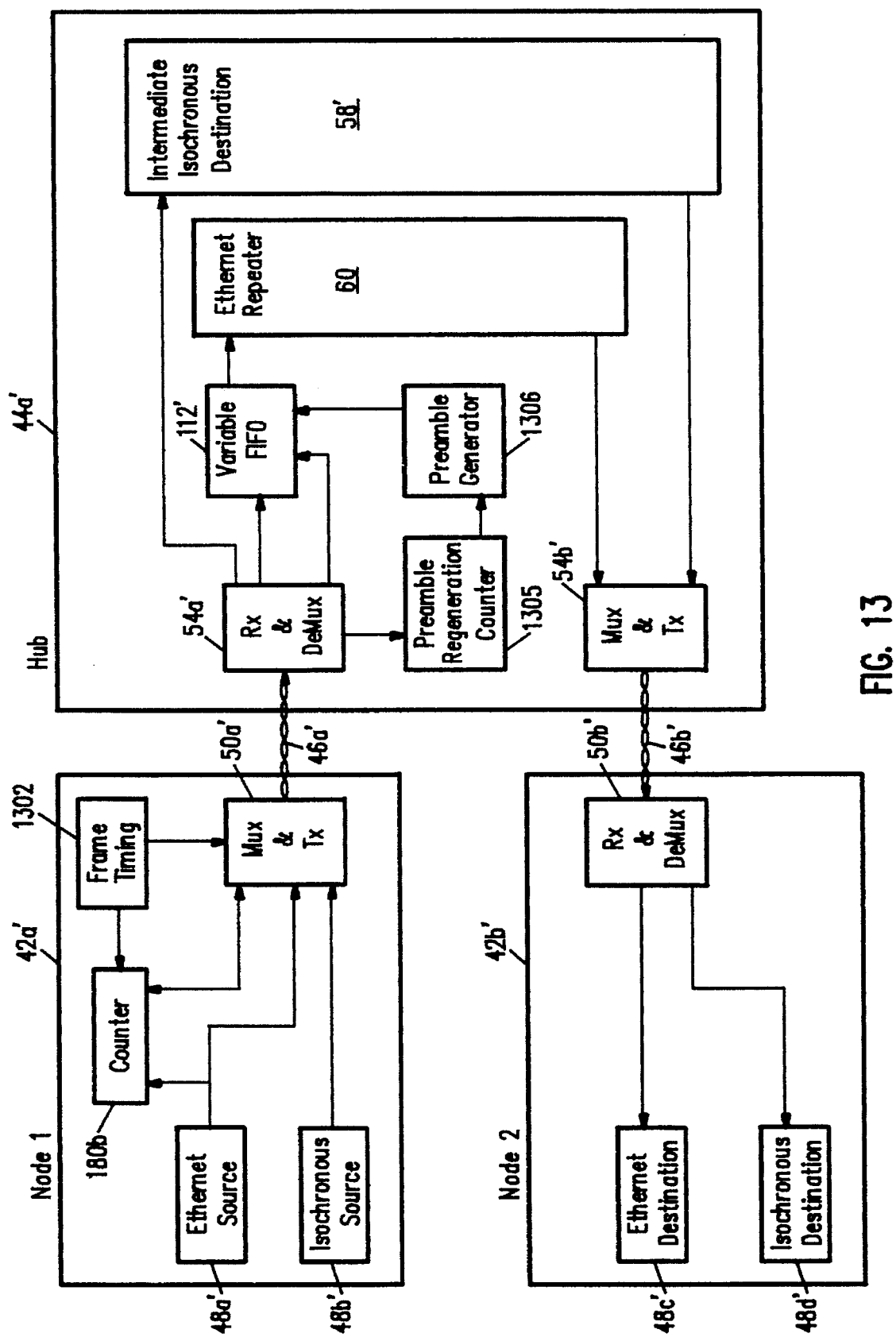
FIG. 13 is a block diagram depicting a system for delay control, according to one embodiment of the present invention.

FIG. 13 depicts a system for delay control according to an embodiment of the present invention. In the first data station or node 42a', contents from the packets output by an Ethernet source 48a' are multiplexed with data from an isochronous source 48b' and transmitted in the frame structure (e.g., according to Table I) by multiplexer and transmitter 50a' for transmission across physical media 46a' to an intermediate destination or hub 44a'. A frame timing device 1302 outputs signals which indicate the beginning of each frame and each time slot of each frame. As soon as a carrier is output from the Ethernet source 48a', a counter 180b is loaded with a value equal to MTD (preferably expressed in the number of bit times equal to MTD). The counter decrements this value for each bit time that elapses until the intelligent prestaging is complete and the contents of the packet are ready to be placed onto the physical medium 46a'. At this point, the contents of the counter 180b will be equal to LDA, i.e., will be equal to MTD decremented by the actual delay (TD) between initiation of the output of a packet from the packet source 48a' and the beginning of placement of the packet onto the physical medium 46a' (in the frame format). This value from the counter 180b is sent to the multiplexer and transmitter 50a' and the information is embedded in the frame sent to the hub 44a'

In one embodiment, the information is embedded by overwriting or replacing one or more of the preamble words 462a, 462b (FIGS. 10A, 10B) of the packet. In one embodiment, the value from the counter 180b replaces preamble data in a nibble-wise fashion. Each nibble is four bits and thus can represent any value between 0 and 15 bit times. Thus, if the LDA is between 0 and 14 bit times, only a single nibble of the preamble is replaced. If the delay value is greater than 14 bit times, then the first nibble will be 15 and at least one other nibble will be used. For example, if the delay value is 17 bit times, the first nibble will indicate a value of 15 and the second nibble will indicate a value of 2. This is summarized in Table IV.

The packet latency counter 180b is then decremented by the value transmitted and a data value is discarded from the transmit FIFO. When a value other than 15 has been transmitted, the transmitter begins the transmission of the remaining values in the transmit FIFO. It is believed that 15 should be a large enough value because there are never more than 15 clock signals between the starting bit of Ethernet symbols in the template of Table I. In a preferred embodiment, the discarded values are always Ethernet preambles so that no unrecoverable information is lost.

TABLE IV

| LDA | 1st Symbol | 2nd Symbol | 3rd Symbol | 4th Symbol | 5th Symbol |
| --- | --- | --- | --- | --- | --- |
| 0–14 | LDA | Preamble | Preamble | Preamble | Preamble |
| 15–29 | 15 | LDA-15 | Preamble | Preamble | Preamble |
| 30–44 | 15 | 15 | LDA-30 | Preamble | Preamble |
| 45–52 | 15 | 15 | 15 | LDA-45 | Preamble |

At the receiving end or second data station (in this case, the hub 44a'), the Ethernet interface 59 recognizes the beginning of a packet as the first "E" slot which does not contain a "no carrier" signal. Thereafter, the first nibbles in the "E" time slots are checked to determine the delay value.

Nonpacket data such as isochronous data is transmitted to, for example, a time slot interchange controller 58'. The information from the "E" time slots of the frame is passed on to a variable FIFO 112'. By controlling the effective length of the FIFO, it is possible to control the amount of delay introduced by the FIFO 112. The value extracted from the first few nibbles, which replaced the preamble symbols of the packet, are used to control the variable length or delay of the variable FIFO 112'. In one embodiment, the delay for the variable FIFO 112' is set to a value equal to the LDA plus a minimum receive delay (MRD). Before the (delayed) reconstructed packet is sent to the Ethernet repeater 60, the initial nibbles of the packet which contained the delay information are replaced by Ethernet preamble symbols.

According to one embodiment, in parsing the delay header, the receiver increments a preamble regeneration counter 1305 and then waits the number of bit times indicated by the first nibble. If the nibble value was 15, the receiver repeats the process on the next nibble. When a value is found which is not 15, the preamble generator 1306 will regenerate the number of preamble nibbles accumulated in the preamble regeneration counter 1305. After the preamble regeneration, the receiver transfers the data accumulated in the receive FIFO 112' to the repeater 60.

FIG. 12E depicts how this procedure and apparatus results in the generation of packets 1226a–1226e whose relative timing and whose relative IFG's 1228a–1228d are the same as the timing 1202a–1202e and gaps 1204a–1204d of the original packets output from the packet source. For example, for original packets 1202b and 1202c, the corresponding regenerated packets 1226b, 1226c are output to the repeater 60 at beginning times 1230b, 1230c which have equal delays 1232b, 1232c with respect to the packet output initiation times 1206b, 1206c despite the differing delays 1208b, 1208c in the sending station. This is achieved because the delay 1234b for packet 1226b is greater than the delay 1234c for packet 1226c by the amount needed to make the delays 1232b, 1232c equal. This is because the value of $LDA_2$ (the LDA transmitted with packet 1202b) is larger than the $LDA_3$ (transmitted with packet 1202c). $LDA_2$ is greater than $LDA_3$ since the counter 1304 was decrementing for a shorter period 1208b with respect to packet 1202b than the period 1208c during which the counter 1304 was decrementing for packet 1202c. Although this scheme produces some amount of delay or latency 1232a–1232e, the system can be configured such that this delay is reduced, preferably being approximately the minimum amount needed to accommodate variability. It is useful to reduce or minimize delays since delays effectively reduce the maximum network distances that can be achieved.

In one embodiment, MDT equals 30 bit times, and MRD equals 23 bit times. In one embodiment, LDA is a value between 0 and 53. These values are believed to represent a system that provides a low or minimum amount of delay 1232a–1232e.

Returning to FIG. 13, in order to convey data from the intermediate destination or hub 44a' to an ultimate destination such as node 42b', data from the intermediate isochronous destination 58' and from the Ethernet repeater 60 are multiplexed, similar to the multiplexing that occurred in multiplexer 50a' and transmitted over physical medium 46b' to node 42b'. If desired, a similar scheme can be used for sending data from the hub to a node, i.e., embedding a value indicative of the delay variation to permit the circuitry in the destination 42b' to remove the variation and regenerate packets having a timing similar to the original packet timing. In this way, the Ethernet destination 48c' can be standard Ethernet circuitry.

Handling of the isochronous data is described in greater detail in commonly-assigned application Ser. No. 07/969,916 entitled "Network Communication with Isochronous Capability" filed on Nov. 2, 1992, now abandoned, and incorporated herein by reference.

After the hub has received data from a node and conveyed it for transmission to the destination node, the data which is intended for the destination node must be placed in a form suitable for transmission across the physical media 46. For example, data 166 output by an Ethernet repeater 60 is transformed by an E transmit interface 168 into a form suitable for supply to the encoder and transmitter. An example of an E transmit interface 168 is depicted in FIG. 8. The transmit interface depicted in FIG. 8 is, in general, the functional inverse of the E receive interface 59 depicted in FIG. 6. The data 166 can be provided in serial form or parallel form. When it is in serial form, the data 166 is de-serialized and is then combined with any necessary alignment error bits 172 (from sync detect circuitry 178) and "no carrier" bits 194 in a multiplexer 174, the output of which is conveyed to a FIFO 176. A sync detect circuit 178 extracts synchronization information from the repeater output 166 for conveying to a state machine 180a. The state machine 180a provides control signals 188 to the FIFO 176. Data is extracted from the FIFO 176 as needed to make up a frame for transmission over the media 46 as described below. The data output from the FIFO 176 is multiplexed with delay value LDA from delay measurement and control circuits 180b, 180c by a multiplexer 196.

Figure 5:
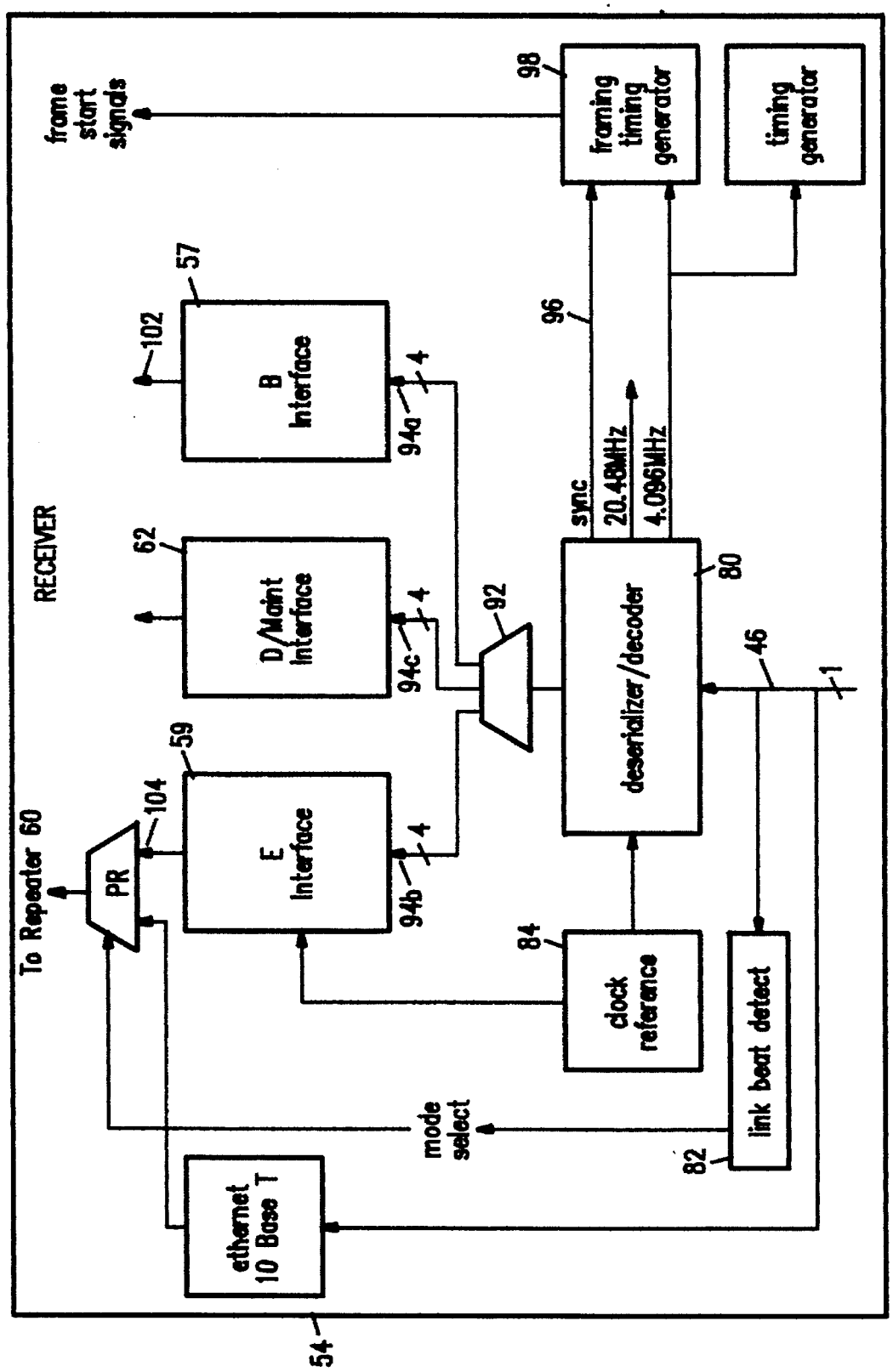
FIG. 5 is a block diagram depicting a receiver portion of circuit 54 of FIG. 2 according to an embodiment of the present invention.
Figure 9:
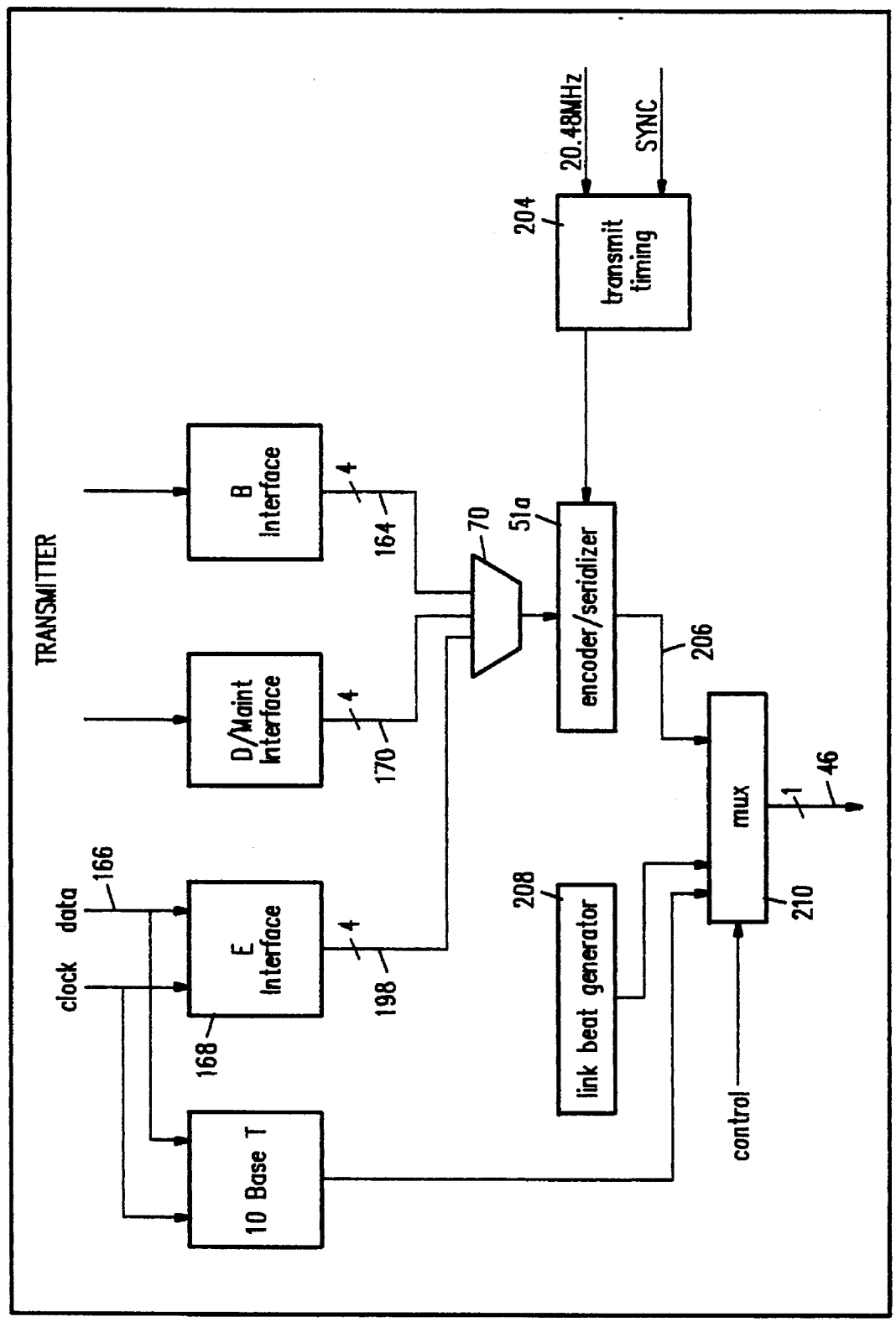
FIG. 9 is a block diagram depicting a transmitter portion of circuit 54 of FIG. 2 according to an embodiment of the present invention.

The data 198 output from the E transmit interface 168 is provided along with isochronous data output 164 and maintenance and D channel data 170 to encoder serializer circuitry 51a, as depicted in FIG. 9. The encoder/serializer 51a is configured substantially like the encoding circuitry found in the node and depicted in FIG. 4. Specifically, the encoder/serializer 51a provides a four/five encoder, an NRZI encoder, and pre-emphasis circuitry. The timing of transmission is controlled by transmit timing circuitry (not shown). The data sent from the hub 44a to the nodes 42 is sent in a frame format which is preferably substantially the same as the frame format used for the data sent from the nodes 42 to the hub 44a as described above. The configuration of the node receiver 50 can be substantially identical to that depicted for the hub receiver 54 (FIG. 5). At the nodes 42, the circuitry 50 includes devices 51b (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42. A buffer circuit 59, receives the separated packet-sourced data and re-times it to convert the "lumpy" discontinuous data defined by the frame structure to a packet form similar to the packet form output by the media access controller 48c, preferably preserving or reconstructing the relative timing of the packets and the IFG's.

Concepts which can be combined with the present invention include introduction of a delay in the timing scheme as described in commonly-assigned application Ser. No. 07/970,313, titled "Isochronous Link Protocol", filed on Nov. 2, 1992, now U. S. Pat. No. 5,406,559 issued Apr. 11,1995, and incorporated herein by reference and provision of FIFOs as described in commonly-assigned application Ser. No. 07/969,917, titled "Apparatus and Method for Accommodating Cable Length Delays Using Isochronous Fifoing", filed on Nov. 2, 1992, now abandoned, and incorporated herein by reference.

In light of the above description, a number of advantages of the present invention can be seen. The present invention receives packetized data and transmits it over a physical medium in a frame format. The frame format permits both packet-sourced data and non-packet-sourced data to be transmitted during each time frame. The packet and IFG timing can be preserved/regenerated e.g., so that previous repeater and MAC circuitry can be used. Overall delay is reduced or minimized to avoid adversely impacting maximum effective network length. In one embodiment, a FIFO is used to re-time the packet-sourced data for use in the frame structure.

A number of modifications and variations of the invention can also be used. The present invention could be used for transmitting only packet-sourced data without the need for connection to isochronous or other packet sources or sinks. Packet-based data other than Ethernet data can be accommodated by the present invention with appropriate changes to the frame template, including token ring or token bus. Although according to one embodiment of the invention, the network circuitry can be provided in a form which is compatible with previous media access controllers and/or previous hub repeater circuitry, it is also possible to provide the present invention in a form where it is not necessary to assure full compatibility with previously available media access controllers and/or hub repeater circuitry.

Although the present invention has been described by way of preferred embodiments and certain variations and modifications, other variations and modifications can also be used, the invention being defined by the following claims.

What is claimed is:

1. A method for transmitting first information from a data source in a first data station to a first data destination in a second data station coupled to said first data station by physical media, wherein the data source outputs said first information in a plurality of data packets, the beginning times for output of said data packets from said data source defining a plurality of packet-start times, the method comprising:

initiating transmission of the information contained in a first of said packets of said first information over said physical media, beginning at a transmission-start time;

determining a first value related to the length of time from said packet-start time of said first packet until said transmission-start time;

communicating said first value to said second data station;

delaying, in said second data station, initiating transfer of said information contained in said first packet to said first data destination for a delay period based on said first value.

2. A method as claimed in claim 1 wherein said steps of initiating, determining, communicating and delaying are repeated for each of a sequence of said packets.

3. A method as claimed in claim 2 wherein said delay periods have values such that the periods between transfer to said first data destination are substantially equal to the corresponding periods between said packet-starts.

4. A method as claimed in claim 2 wherein each of said packets has a packet-end time, defining a plurality of inter-packet gaps between said packet-end times of said packets and said transmission-start times of immediately following packets, and wherein each said transfer to said first data destination has a transfer-start time and a transfer-end time defining inter-transfer gaps between said transfer-end times of said transfers and said transfer-start times of immediately following transfers, and wherein said delay periods have values such that said inter-transfer gaps are substantially equal to the corresponding inter-packet gaps.

5. A method as claimed in claim 1 wherein said step of delaying includes holding a portion of said first information in a first-in-first-out memory.

6. A method as claimed in claim 5 wherein said first-in-first-out memory is a variable-delay memory and wherein said step of delaying includes selecting a delay for said variable-delay memory based on said first value.

7. A method as claimed in claim 1 wherein said step of determining a first value includes providing a first counter having a predetermined value in said counter at said packet-start times, and decrementing or incrementing said counter at a predetermined rate until said transmission-start time.

8. A method as claimed in claim 1 wherein a first portion of each of said plurality of packets comprises preamble words different from said first information and wherein said step of communicating includes replacing one or more of said preamble words with first data indicating said first value.

9. A method as claimed in claim 8 wherein said step of replacing is performed prior to initiating transfer to said first data destination.

10. A method as claimed in claim 1 wherein said second data station is a hub of a communications network.

11. A method as claimed in claim 1 wherein said data source outputs said first information in a plurality of data packets according to an Ethernet protocol.

12. A method as claimed in claim 11 wherein said first data destination is an Ethernet repeater for use in transferring information to a second data destination.

13. A method as claimed in claim 12 wherein said second data destination is a third data station, coupled to said second data station.

14. A method as claimed in claim 1 further comprising:

generating a plurality of frame-start signals, each frame start signal defining a predetermined number of time slots, wherein a plurality of said predetermined number of time slots are reserved for uses other than transmission of said first information to define reserved time slots and non-reserved time slots;

performing pre-treatment of said first information in said first data station;

wherein said transmission of the information contained in said first said packet is performed by transmitting said first information during a plurality of said non-reserved time slots beginning at said transmission-start time, wherein said transmission start-time is the first non-reserved time slot which occurs following said pretreatment of the first packet of said first information.

15. Apparatus usable for transmitting first information from a data source associated with a first data station to a first data destination associated with a second data station, said apparatus coupled to said first data station by physical media, wherein the data source outputs said first information in a plurality of data packets, the beginning times for output of said data packets from said data source defining a plurality of packet-start times, the apparatus comprising:

a transmitter configured to initiate transmission of the information contained in a first of said packets of said first information over said physical media beginning at a transmission-start time;

a timer coupled to said transmitter and configured to determine a value related to the length of time from said packet-start time of said first packet until said transmission-start time;

said transmitter also configured to transmit said first value to said second data station; and a data delay device in said second data station configured to delay the initiation of transfer of said information contained in said first packet to said first data destination for a delay period based on said first value.

16. Apparatus as claimed in claim 15 wherein said timer comprises a counter configured to reset to a predetermined value at said packet-start times, to decrement or increment at a predetermined rate, and to output the value which the counter holds at said transmission-start time.

17. Apparatus as claimed in claim 15 wherein said delay device comprises a first-in-first-out buffer having a variable effective buffer length which is controlled based on said first value.

18. Apparatus for transmitting first information from a data source in a first data station to a first data destination in a second data station, said second data station coupled to said first data station by physical media, wherein the data source outputs said first information in a plurality of data packets, the beginning times for output of said data packets from said data source defining a plurality of packet-start times, the apparatus comprising:

means for initiating transmission of the information contained in a first of said packets of said first information over said physical media beginning at a transmission-start time;

a timer for determining a first value related to the length of time from said packet-start time of said first packet until said transmission-start time;

means for communicating said first value to said second data station;

means, in said second data station, for delaying the initiation of the transfer of said information contained in said first packet to said first data destination for a delay period based on said first value.

19. Apparatus as claimed in claim 18 wherein said means for delaying includes a variable-length FIFO memory.

20. A method for transmitting both data from a packet source and data from an isochronous source onto a physical medium comprising:

transmitting signals onto said physical medium during a first time frame, said frame comprising a predetermined number of time slots, according to a first frame structure defining first and second pluralities of time slots wherein said first plurality of said time slots is used for transmission of a first plurality of symbols in response to said isochronous data source, each of said first plurality of symbols comprising a plurality of bit-groups, each for conveying a first predetermined number of data bits, and said second plurality of said time slots being used for transmission of a second plurality of symbols in response to said packet source, said second plurality of symbols comprising a first bit-group for transmission in response to a period of non-output of a packet from said packet source and a plurality of bit-groups, different from said first bit-group, each for conveying a first predetermined number of data bits in response to output of a packet from said packet source, repeating said step of transmitting, during subsequent time frames, at regular time intervals, according to said first frame structure; and retiming said second plurality of symbols to place said second plurality of symbols in a packet form.

21. A method as claimed in claim 20 wherein said step of retiming includes delaying said second plurality of symbols to reproduce timing characteristics of said packet output from said packet source.

* * * * *